US012266132B2

(12) United States Patent
Jiang

(10) Patent No.: US 12,266,132 B2
(45) Date of Patent: Apr. 1, 2025

(54) GEOLOGICAL FEATURE DETECTION USING GENERATIVE ADVERSARIAL NEURAL NETWORKS

(71) Applicant: Landmark Graphics Corporation, Houston, TX (US)

(72) Inventor: Fan Jiang, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 409 days.

(21) Appl. No.: 17/621,454

(22) PCT Filed: May 29, 2020

(86) PCT No.: PCT/US2020/035364
§ 371 (c)(1),
(2) Date: Dec. 21, 2021

(87) PCT Pub. No.: WO2021/050122
PCT Pub. Date: Mar. 18, 2021

(65) Prior Publication Data
US 2022/0351403 A1    Nov. 3, 2022

Related U.S. Application Data

(60) Provisional application No. 62/899,547, filed on Sep. 12, 2019.

(51) Int. Cl.
*G06T 7/70* (2017.01)
*G01V 1/30* (2006.01)
(Continued)

(52) U.S. Cl.
CPC .............. *G06T 7/70* (2017.01); *G01V 1/307* (2013.01); *G06N 3/045* (2023.01); *G06N 3/047* (2023.01);
(Continued)

(58) Field of Classification Search
CPC ... G06T 7/70; G06T 3/40; G06T 2207/30181; G06N 3/045; G06N 3/047; G06N 3/08;
(Continued)

(56) References Cited

U.S. PATENT DOCUMENTS 11,320,551 B2 *   5/2022   Liu ......................... G06N 3/08
2019/0017374 A1   1/2019   Misra et al.
(Continued)

FOREIGN PATENT DOCUMENTS

WO     WO-2019118658 A1 *   6/2019   ............ E21B 43/00

OTHER PUBLICATIONS

Alwon, "Generative Adversarial Networks in Seismic Data Processing", Society of Exploration Geophysicists, 2018, p. 1991-1995. (Year: 2018).*

(Continued)

*Primary Examiner* — Amandeep Saini
*Assistant Examiner* — Daniella M. DiGuglielmo
(74) *Attorney, Agent, or Firm* — DeLizio, Peacock, Lewin & Guerra, LLP

(57) ABSTRACT

Seismic image data acquired for a subsurface formation from a data acquisition system is input into a deep neural network to generate fault detection data for the subsurface formation comprising probability values at a grid of locations in the subsurface formation. The fault detection data is preprocessed via downsampling and distributed weighted factors and inputted into a generative adversarial network (GAN) upscaling generator to create high resolution fault detection data with minimized distortion and artifacts. The GAN upscaling generator is pre trained on synthetic fault data in a GAN training system using adversarial training against a GAN upscaling discriminator, and both the GAN
(Continued)

upscaling generator and the GAN upscaling discriminator learn to approximate the distribution of the synthetic fault data.

20 Claims, 10 Drawing Sheets

(51) Int. Cl.
 G06N 3/045 (2023.01)
 G06N 3/047 (2023.01)
 G06N 3/08 (2023.01)
 G06T 3/40 (2024.01)

(52) U.S. Cl.
 CPC ............. *G06N 3/08* (2013.01); *G06T 3/40* (2013.01); *G01V 1/302* (2013.01); *G01V 2210/642* (2013.01); *G06T 2207/30181* (2013.01)

(58) Field of Classification Search
 CPC ... G01V 1/307; G01V 1/302; G01V 2210/642
 See application file for complete search history.

(56) References Cited

U.S. PATENT DOCUMENTS

2019/0057168 A1  2/2019  Holland et al.
2019/0249534 A1* 8/2019  Hoeink ................... G06F 17/18
2020/0292723 A1* 9/2020  Zhang .................... G01V 1/301
2022/0229199 A1* 7/2022  Li ........................... G01V 1/302

OTHER PUBLICATIONS

Dean, M., "Probability Weighting," Lecture Notes for Spring 2015 Behavioral Economics—Brown University, p. 1-8. (Year: 2016).*
PCT Application Serial No. PCT/US2020/035364 International Search Report, mailed Sep. 17, 2020, 3 pages.
PCT Application Serial No. PCT/US2020/035364 Written Opinion, mailed Sep. 17, 2020, 7 pages.
Alwon, "Generative Adversarial Networks in Seismic Data Processing", Society of Exploration Geophysicists. 2018 SEG International Exposition and Annual Meeting, Anaheim, California, USA, Oct. 2018. Paper No. SEG-2018-2996002 https://doi.org/10.1190/segam2018-2996002.1, Oct. 14, 2018, pp. 1991-1995.
Goodfellow, et al., "Generative Adversarial Nets", 27th Intl Conference on Neural Information Processing Systems, Jun. 10, 2014, 9 pages.
Lu, et al., "Using Generative Adversarial Networks to Improve Deep-Learning Fault Interpretation Networks", The Leading Edge, Special Focus: Big-Data Visualization and Interpretation, Aug. 2018, pp. 578-583.

* cited by examiner

GEOLOGICAL FEATURE DETECTION USING GENERATIVE ADVERSARIAL NEURAL NETWORKS

BACKGROUND

The disclosure generally relates to the field of subsurface formation evaluation, and more particularly to geological feature detection using generative adversarial neural networks.

Interpretation of seismic data can enhance understanding of subsurface geological features in a formation (e.g., faults, fractures, groups of fractures, porous regions, etc.). These seismic interpretations can provide the position and shape of these subsurface geological features. The position and shape of these subsurface geological features can be useful to optimizing hydrocarbon production during drilling and stimulation treatments. For example, drilling location, various drilling parameters, production parameters, drilling project characterization and ranking, etc. can be determined based on knowledge of the position and shape of these subsurface geological features. Increasing the accuracy and speed of seismic interpretation through the use of fault interpretation algorithms can increase the efficiency, economy, and safety of drilling and stimulation operations.

The complexity of seismic data can result in fault interpretation workflows that include several operations which involve significant manual effort and/or a substantial number of parameters. Moreover, each operation can involve a significant amount of human input, such as testing many different parameters in these algorithms to determine their effects, classifying several types of detected features, and verifying that an algorithm is accurate during post-processing. These factors can increase the time and computing cost of performing a seismic interpretation and reduce the accuracy of the resulting interpretations.

Generative adversarial networks comprise a generator network and a discriminator network that simultaneously learn an unknown data distribution. Training occurs when the generator receives batches of input data which it uses to generate a batch of output data which the discriminator evaluates. The discriminator trains itself (e.g., using stochastic gradient descent) on the batch of output data and simultaneously evaluates the quality of the batch of output data using data from the unknown distribution corresponding to the batch of input data. Based on this evaluation, the discriminator returns a batch of quality values for the batch of output data to the generator. The generator trains itself according to the batch of quality values it receives from the discriminator. The loss functions for the generator and the discriminator are related, and the distributions of the generator and discriminator are trained simultaneously for each batch of data.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to generating high resolution fault images with minimized distortion and artifacts in illustrative examples. Aspects of this disclosure can be instead applied to generating high resolution images of salt bodies or seismic facies with minimized distortion and artifacts. In other instances, well-known instruction instances, protocols, structures and techniques have not been shown in detail in order not to obfuscate the description.

Overview

Fault identification systems can include edge detection. After any edge detection, fault identification systems can input seismic image data for a formation into a deep neural network (DNN) (e.g., a convolutional neural network (CNN)). The DNN can be trained on seismic data with known fault locations and can output fault detection data that includes a probability map that predicts the likelihood of a fault occurring at a set of locations (i.e. a grid) in the formation. However, these probability maps can suffer from artifacts due to the internal architecture of the DNN. In the case of CNNs, these artifacts are often spatial artifacts such as horizontal or vertical edges that can distort fault detection data. Example embodiments can include a generator that recovers high resolution fault detection images (i.e., heat maps of the probability map for fault detection) from fault detection images that have distortion or artifacts.

The generator can be a GAN upscaling generator trained using a generative adversarial network (GAN) on synthetic fault data. The synthetic fault data can include distorted synthetic fault detection data with synthetically generated artifacts and corresponding synthetic fault detection data without artifacts. In some embodiments, the GAN upscaling generator is configured to receive downsampled (low resolution) and weighted synthetic fault detection data. The GAN upscaling generator can then output upscaled (high resolution) fault detection data with mitigated image artifacts. The distorted synthetic fault detection data can be both downsampled and weighted in order to obfuscate any distortions and artifacts before the GAN upscaling generator produces an upscaled version of the downsampled weighted synthetic fault detection data. The GAN can also include a GAN upscaling discriminator that is used to train the GAN upscaling generator to generate high quality upscaled fault detection data. Once trained, the GAN upscaling generator can efficiently produce high resolution versions of fault detection data that have minimal distortion and artifacts.

Example Illustrations

Figure 1:
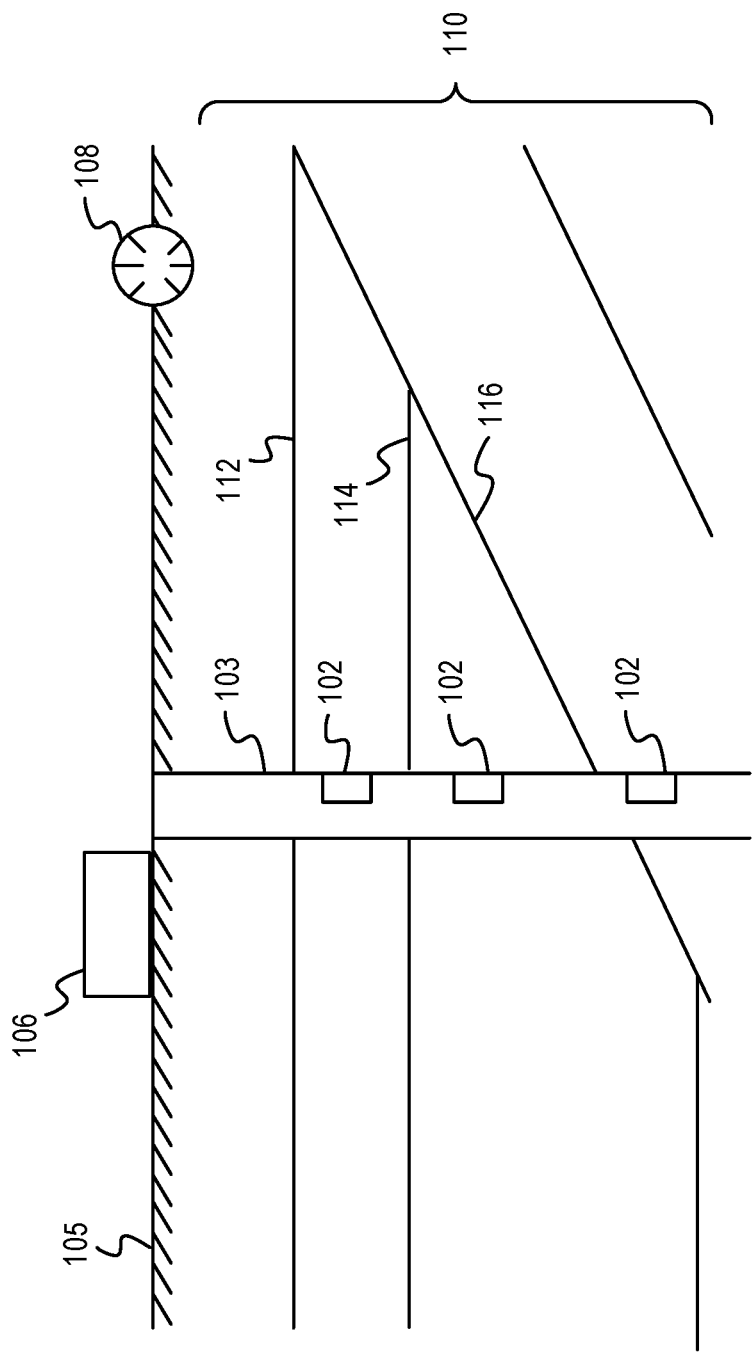
FIG. 1 depicts a schematic diagram of a borehole seismic survey environment, according to some embodiments.
Figure 8:
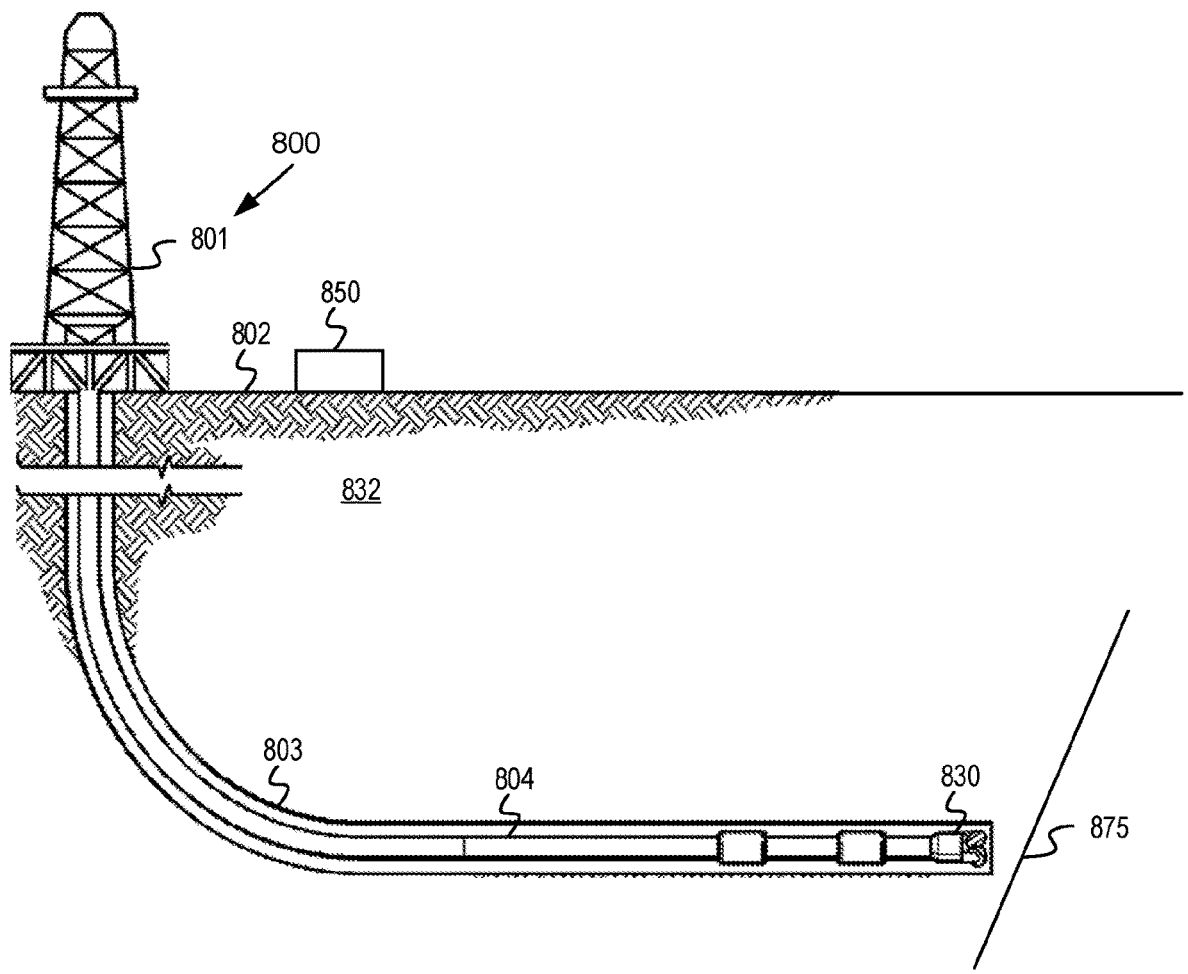
FIG. 8 depicts an example drilling system, according to some embodiments.
Figure 9:
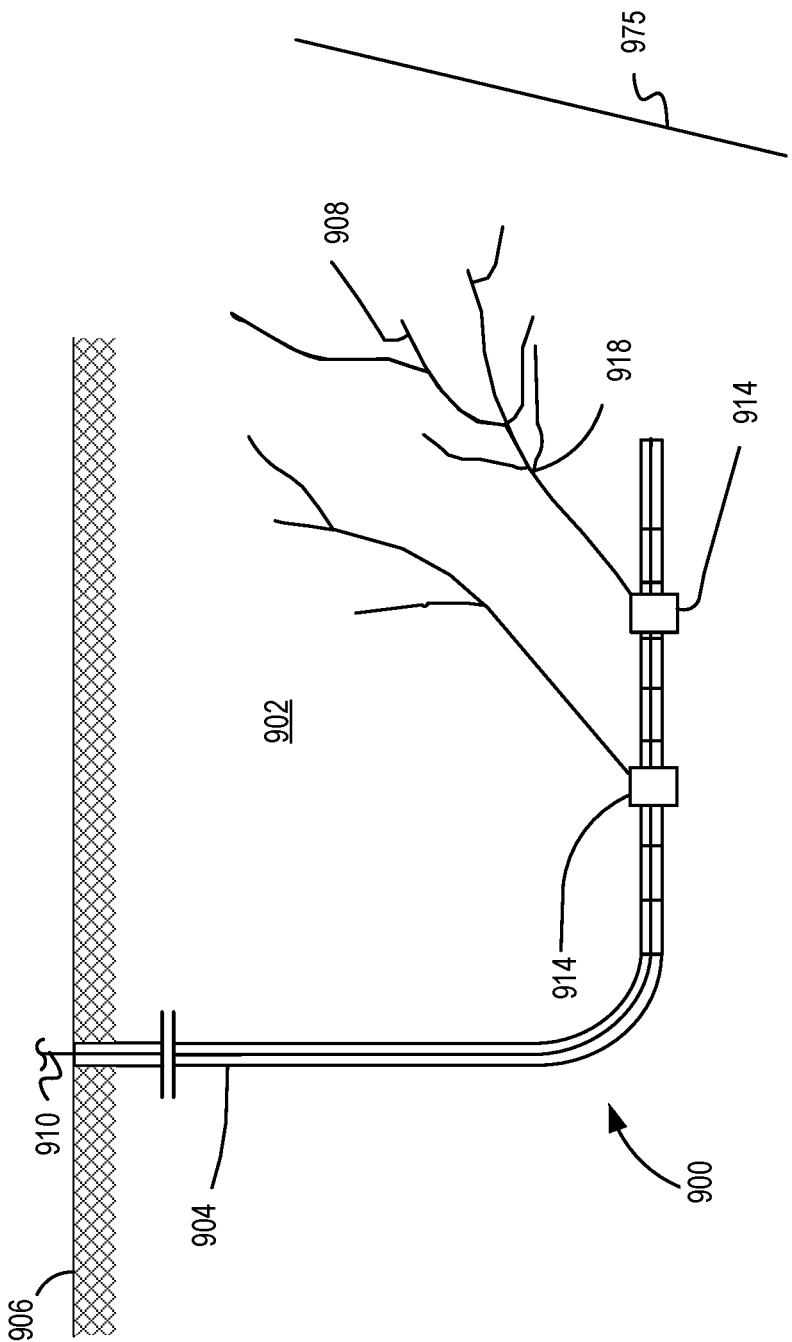
FIG. 9 depicts an example wellbore system near a fault, according to some embodiments.

FIG. 1 depicts a schematic diagram of a borehole seismic survey environment, according to some embodiments. Seismic sensors 102 are in a spaced-apart arrangement within a borehole 103 to detect seismic waves. In this example, the seismic sensors 102 are attached to the borehole 103 or a casing that has been positioned the borehole 103. In some other embodiments, the seismic sensors 102 can be part of a drilling operation or wireline logging operation. An example of such a drilling operation and a wireline logging operation are depicted in FIG. 8 and FIG. 9, respectively, which are further described below. Further, the seismic sensors 102 can communicate wirelessly or via cable to a data acquisition system 106 at a surface 105, where the data acquisition system 106 receives, processes, and stores seismic signal data collected by the seismic sensors 102. To generate seismic signal data, a seismic source 108 can be activated at one or more positions to generate seismic energy waves that propagate through a formation 110. Such waves reflect from acoustic impedance discontinuities to reach the seismic sensors 102. Illustrative discontinuities include faults, boundaries between formation beds, and boundaries between formation fluids such as the faults 112, 114, and 116 in FIG. 1. The discontinuities can appear as bright spots in the subsurface structure representation that is derived from the seismic signal data. The collected seismic signal data can be used to generate a seismic dataset. While FIG. 1 depicts the data acquisition system 106 and the seismic source 108 at the surface, in other embodiments, either or both can be positioned at other locations. For example, either or both the data acquisition system 106 and the seismic source 108 can be positioned in the borehole 103.

Figure 2:
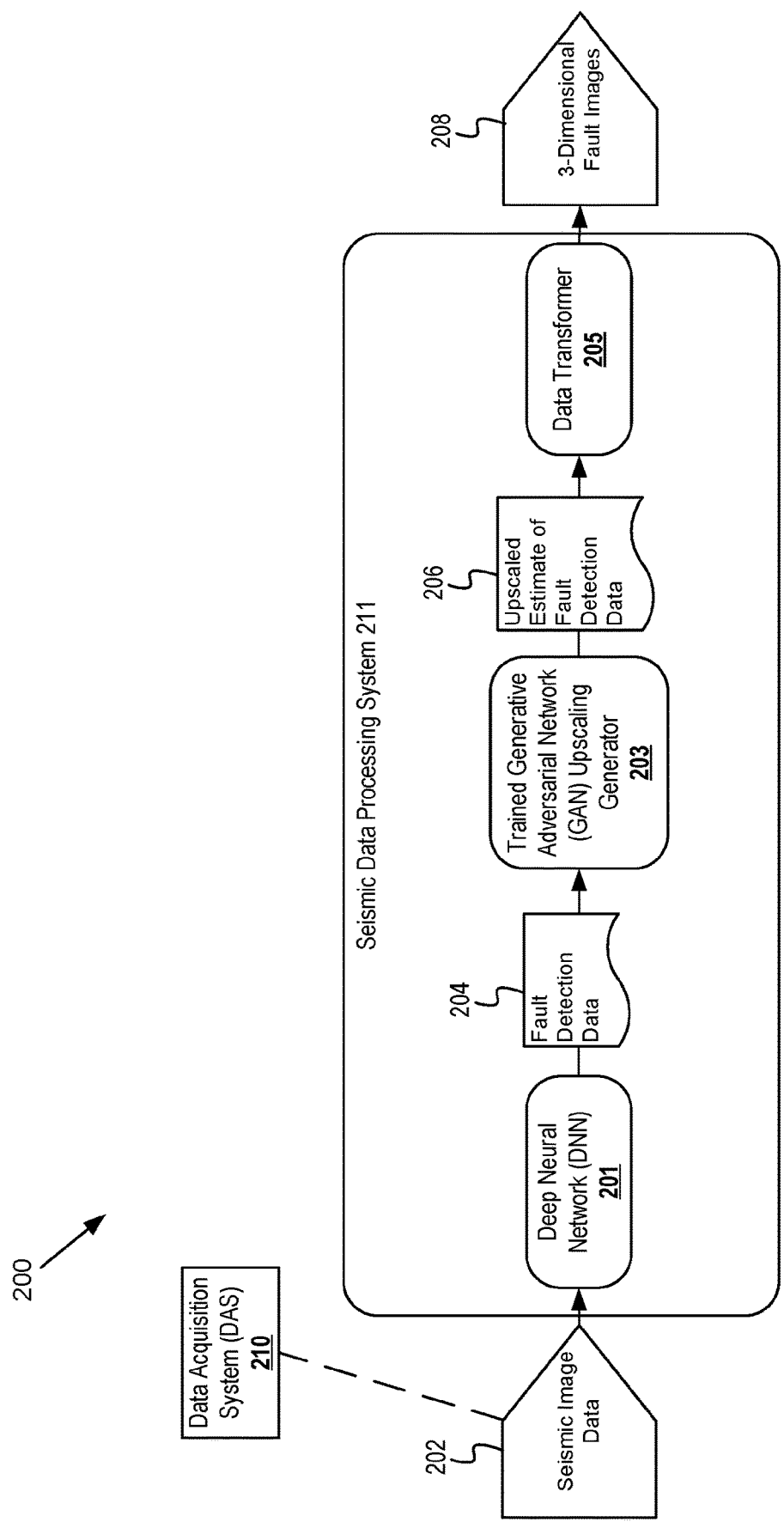
FIG. 2 is a conceptual diagram of a data processing system for fault detection image generation, according to some embodiments.

FIG. 2 is a conceptual diagram of a data processing system for fault detection image generation, according to some embodiments. FIG. 2 depicts a data processing system 200 that includes a data acquisition system (DAS) 210 and a seismic data processing system 211. The DAS 210 can be an example of the data acquisition system 106 of FIG. 1. The DAS 210 collects seismic image data 202 for a subsurface formation. For example with reference to FIG. 1, the DAS 200 can collect the seismic image data 202 from the seismic sensors 102 positioned in the borehole 103. The DAS 210 forwards the seismic image data 202 to the seismic data processing system 211. The seismic data processing system 211 can include a deep neural network (DNN) 201, a trained GAN upscaling generator 203, and a data transformer 205. The DNN 201 receives the seismic image data 202. The DNN 201 uses the seismic image data 202 as input and outputs fault detection data 204 to the trained GAN upscaling generator 203. The GAN upscaling generator 203 uses the fault detection data 204 as input to generate upscaled estimates of fault detection data 206 to send to the data transformer 205. The data transformer 205 processes the upscaled estimates of fault detection data 206 to create 3-dimensional fault images 208.

The DNN 201 can be a CNN trained on seismic image data with known fault locations to generate a probability map of fault locations in the seismic image data. The fault detection data 204 output by the DNN 201 can include a probability map for a set of locations in the formation that indicate a likelihood that a fault occurs at each location. The probability map can comprise a set of tuples, each tuple having a probability value and a set of coordinates for a location with respect to a frame of reference in the subsurface formation. This set of locations can be a grid of locations throughout the subsurface formation, typically windowed inside a rectangular prism. In some embodiments, the DNN 201 is pretrained on seismic image data with known fault locations with a loss function that penalizes low probability values at known fault locations and high probability values and known locations without a fault.

The DNN 201 can include, in addition to a neural network, an edge detector that searches for candidate discontinuities comprising subsets of the seismic data. The edge detector then partitions the seismic data by candidate discontinuities and sends each partition element to the neural network to classify a partition-level likelihood of fault occurrence. This operation can introduce additional artifacts due to partitioning in the seismic data.

The trained GAN upscaling generator 203 receives the fault detection data 204 comprising a map of probability values for the subsurface formation. The trained GAN upscaling generator 203 can be configured to downsample (i.e. reduce the resolution) of the map of probability values by a predetermined factor (e.g., a factor of 4) to produce lower resolution fault detection data to use as input. In other embodiments, a separate data processing component (not pictured) can downsample the fault detection data 204 before inputting the data into the trained GAN upscaling generator 203. The downsampling operation can include blocking the fault detection data into 2×2 blocks for each slice of seismic data in an axial direction and sampling a single probability value from each 2×2 block. In embodiments where the downsampling occurs at a factor different than 4, different sizes of blocks can be used. Additionally, different shapes other than blocks can be implemented. The downsampling can choose a probability value using one or more different techniques. For example, the downsampling can choose a probability value at random from each 2×2 block, can choose a probability value evenly distributed across 2×2 blocks, can average the probability values within each 2×2 block, etc. Any standard downsampling operations on the fault detection data 204 can alternatively be implemented.

As an additional preprocessing operation performed by the DNN 201 or a separate data processing component, the downsampled fault detection data can be modified using distributed weight factors. The distributed weighting factors modify probability values in the downsampled fault detection data to be soft thresholded towards 0 if the probability values are near 0 and towards 1 if the probability values are towards 1. For example, the soft thresholding function can be, for a probability value x, $x^2$ if x<0.5, and $1-(1-x)^2$ if x>0.5. Other soft thresholding functions can be used.

The trained GAN upscaling generator 203 can use the fault detection data 204, after a preprocessing operation(s) as described variously above, as input to its' internal network layers. The fault detection data 204 can propagate through internal layers of the GAN upscaling generator 203 and a final layer produces an output that includes the upscaled estimate of fault detection data 206. The upscaled estimate of fault detection data 206 can include a probability map of the formation at the same resolution as the fault detection data 204 or at a different increased resolution.

The data transformer 205 processes the upscaled estimate of fault detection data 206 to produce fault images 208. For example, the data transformer 205 can produce three-dimensional fault images. The data transformer 205 can, for example, convert JPEG or PNG formatted fault data into an SEGY formatted image. Probability values in the fault detection data 206 can be converted into a graphical heat map over the formation using image processing software designed for seismic data processing.

Figure 3:
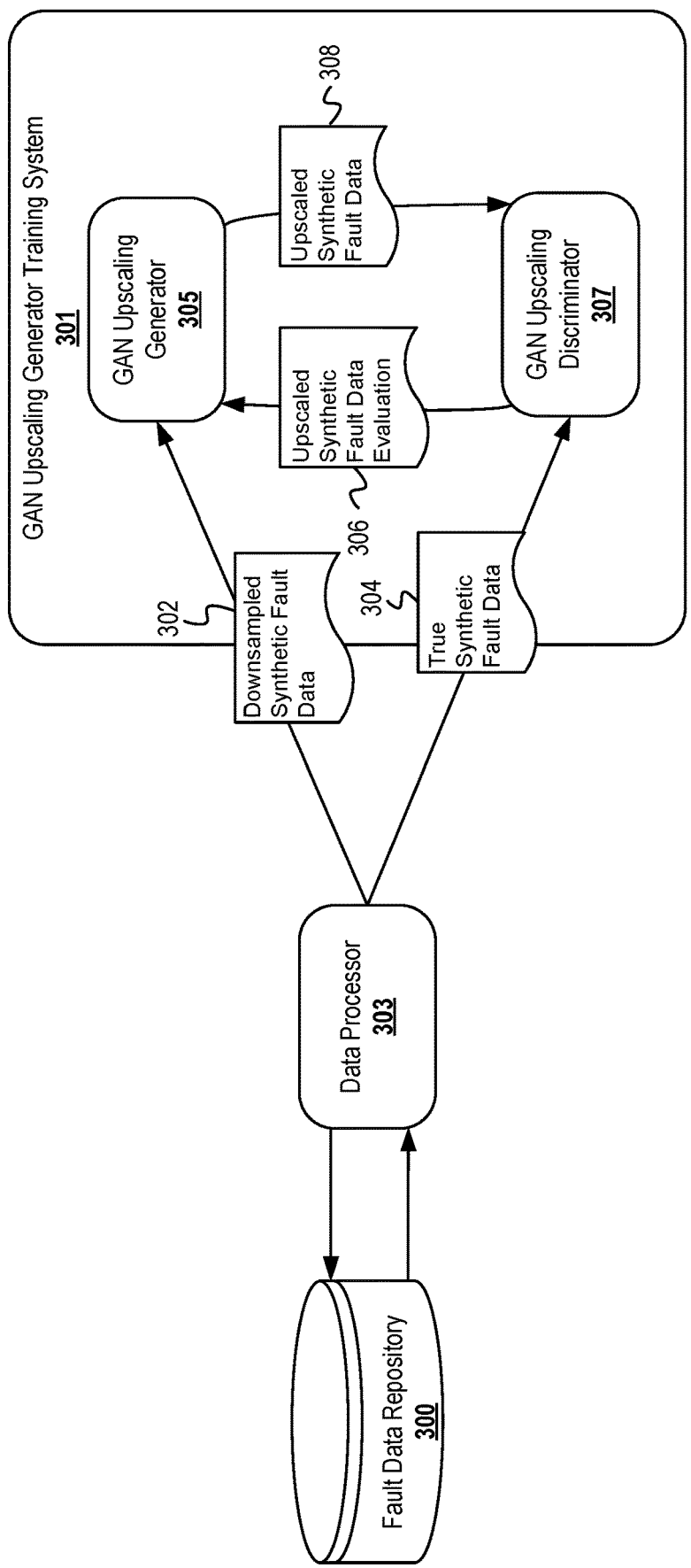
FIG. 3 is a conceptual diagram of training operations for a GAN upscaling generator training system, according to some embodiments.

FIG. 3 is a conceptual diagram of training operations for a GAN upscaling generator training system, according to some embodiments. In some embodiments, such training operations can be used to create the trained GAN upscaling generator 203 depicted in FIG. 2. A data processor 303 queries a fault data repository 300 for synthetic fault data to be used for training. The fault data repository 300 returns fault data which the data processor 303 parses and sends downsampled synthetic fault data 302 and true synthetic fault data 304 to a GAN upscaling generator 305 and to a GAN upscaling discriminator 307, respectively, within a GAN upscaling generator training system 301. The GAN upscaling generator 305 and the GAN upscaling discriminator 307 train on batches of the data 302, 304 by an adversarial process where the GAN upscaling generator 305 sends upscaled synthetic fault data 308 to the GAN upscaling discriminator 307 and, in response, the GAN upscaling discriminator 307 sends an upscaled synthetic fault data evaluation 306 to the GAN upscaling generator 305.

The synthetic fault data retrieved from the fault data repository 300 can be generated prior to training using real fault data as reference and can be augmented by various random processes including scaling, rotation, dilation, etc. True fault data and distorted fault data can be stored in the fault data repository 300, wherein the distorted fault data is generated from the true fault data by adding distortion and artifacts. For example, the true fault data can be run through a deep neural network (such as the DNN 201 with reference to FIG. 2) in order to generate distorted fault data. The data processor 303 separates the true fault data and the corresponding distorted fault data and sends the true synthetic fault data 304 to the GAN upscaling discriminator 307 in batches. In corresponding batches, the data processor 303 downsamples the distorted fault data to generate the downsampled synthetic fault data 302 which it sends to the GAN upscaling generator 305. This downsampling step can occur, for example, as in the description for FIG. 2.

The GAN upscaling generator 305 and the GAN upscaling discriminator can learn the distribution of the true synthetic fault data 304 in tandem via an adversarial game where the GAN upscaling generator 305 generates batches of upscaled synthetic fault data 308 based on the downsampled synthetic fault data. The GAN upscaling discriminator 307 receives the upscaled synthetic fault data 308 and evaluates it based on its learned distribution of the true synthetic fault data (encoded as internal network parameters) to generate the upscaled synthetic fault data evaluation 306. The GAN upscaling discriminator 307 can simultaneously receive the true synthetic fault data 304 and compare the true synthetic fault data 304 with the upscaled synthetic fault data 308 (using some appropriate distance metric on the synthetic fault data, for example Wasserstein distance). Using a discriminator loss function relative to the upscaled synthetic fault data evaluation 306 and this comparison, the GAN upscaling discriminator 307 can backpropagate the loss through its internal network parameters to improve its knowledge of the distribution of true synthetic fault data 304. The GAN upscaling generator 305 can receive the upscaled synthetic fault data evaluation 306 and can update its internal network parameters according to a generator loss function that uses the upscaled synthetic fault data evaluation 306 as input.

The generator loss function and discriminator loss function for the GAN upscaling generator 305 and the GAN upscaling discriminator 307 respectively can be designed so that the GAN upscaling generator 305 and the GAN upscaling discriminator 307 learn the distribution of true synthetic fault data 304 in tandem. These loss functions can be standard loss functions used for generating super resolution images using GANs. Moreover, the internal architecture of the GAN upscaling generator 305 and the GAN upscaling discriminator 307 can be a standard GAN architecture for super resolution image generation for GANs. Various types of internal architecture using internal convolutional layers, max-pooling activation functions, leaky, parametric, or standard rectified linear unit activation functions, fully connected layers, residual blocks of layers with skip connection, etc. can be used with varying parameters depending on the distribution of the synthetic fault data.

In some embodiments, the GAN upscaling generator 305 and the GAN upscaling discriminator 307 are trained on batches of data 302, 304 until their loss function values for a batch of data are below a threshold loss function value, or until a threshold number of batches of data ("epochs") is reached. Once training has terminated, the GAN upscaling generator 305 can be stored in a model repository for deployment using real world fault data.

Figure 4:
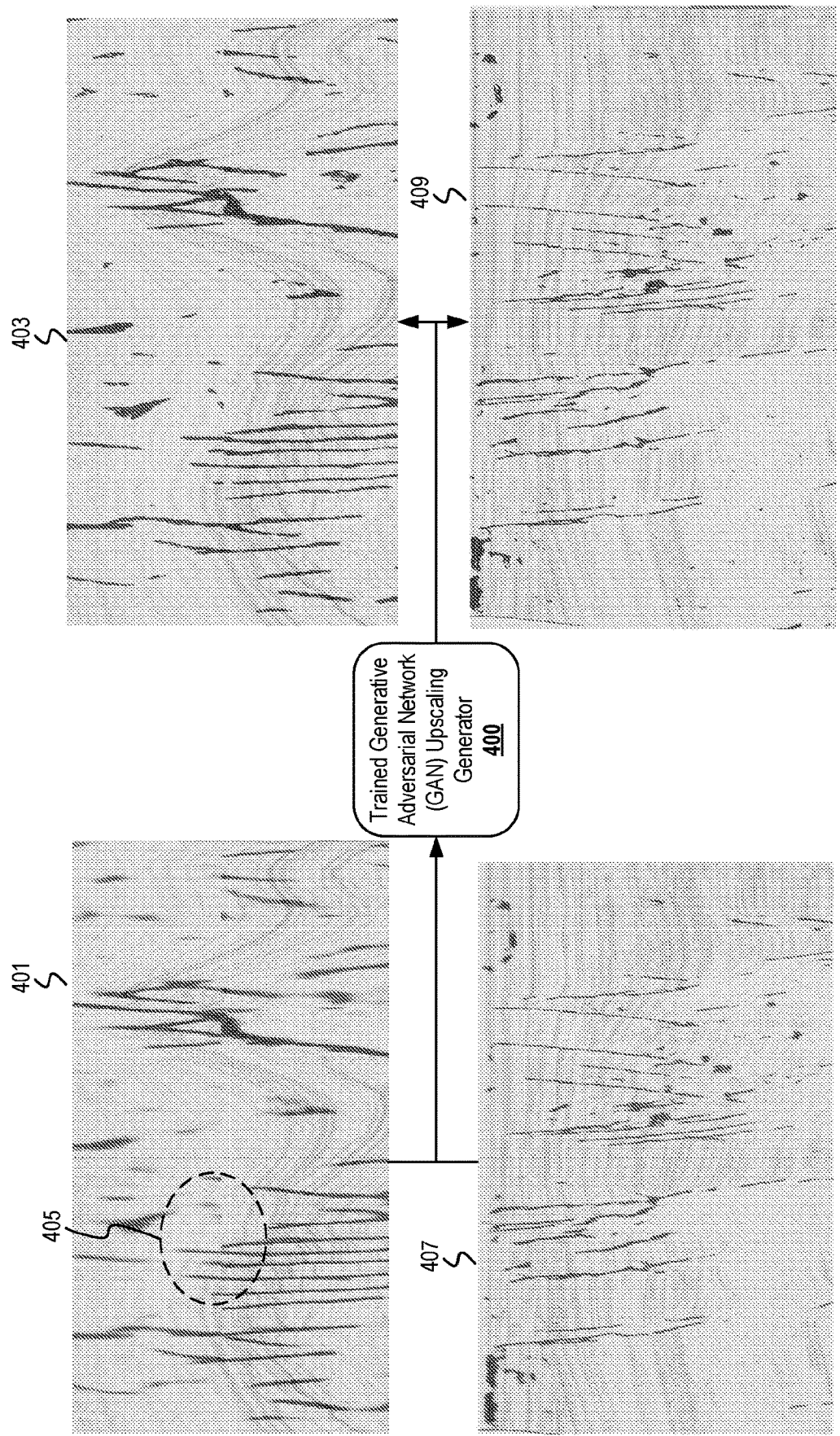
FIG. 4 depicts a first example input and output to a trained GAN upscaling generator, according to some embodiments.
Figure 5:
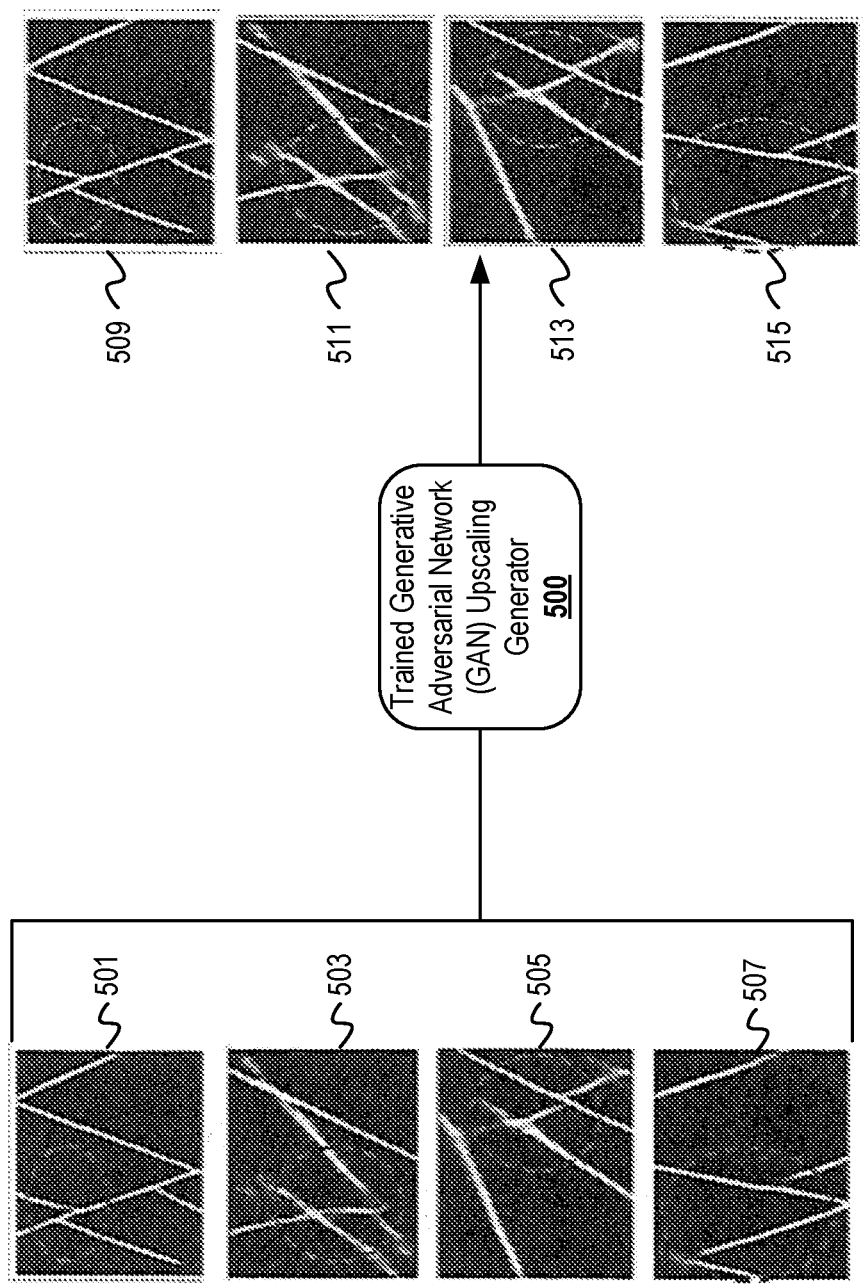
FIG. 5 depicts a second example input and output to a trained GAN upscaling generator, according to some embodiments.
Figure 6:
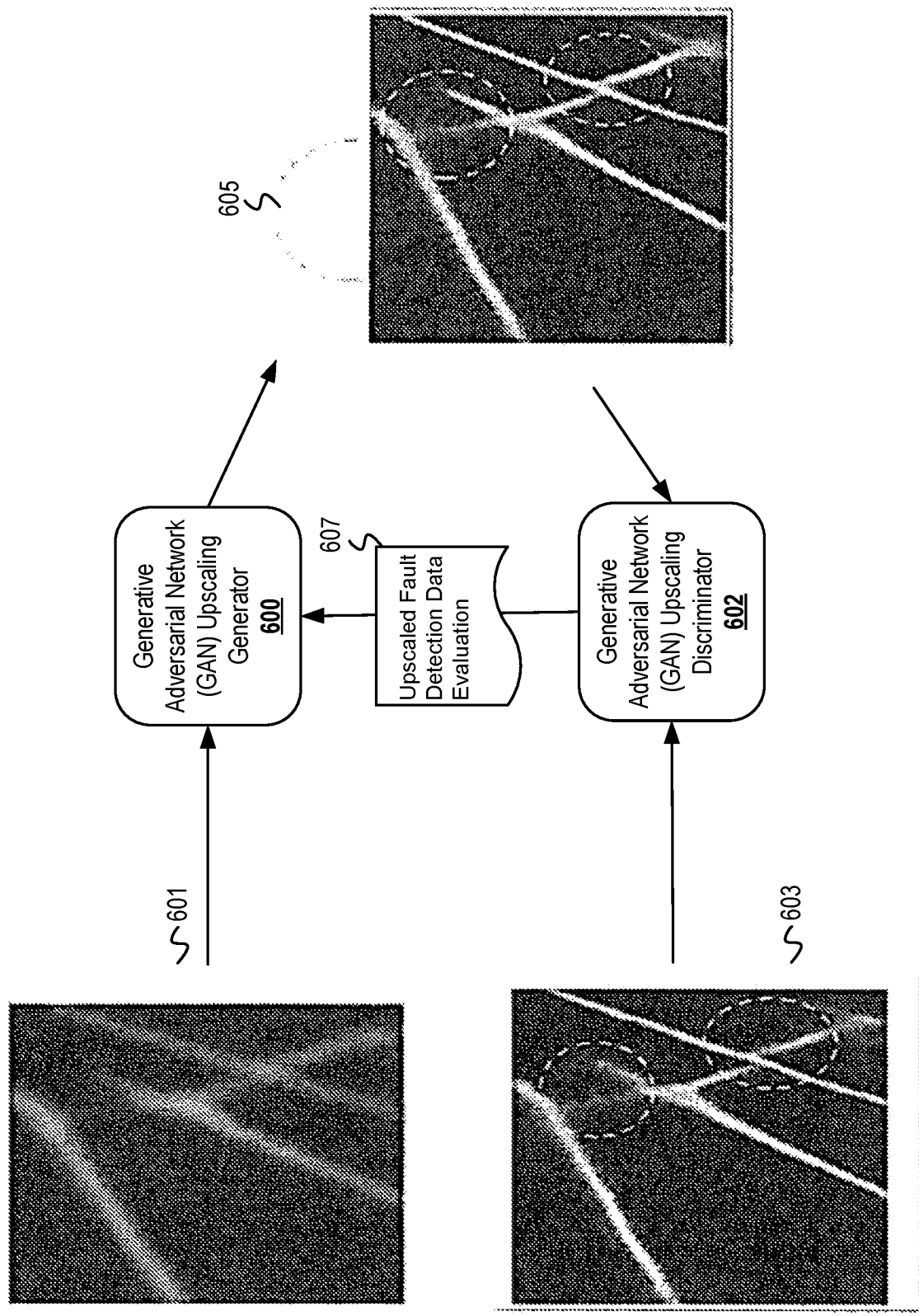
FIG. 6 depicts example input and output during training operations of a GAN upscaling generator training system, according to some embodiments.

FIGS. 4-6 are examples of fault detection data (as output, for example, by the DNN 201 with reference to FIG. 2) and corresponding outputs of high resolution fault detection data from a trained GAN upscaling generator (for example, the trained GAN upscaling generator 203 with reference to FIG. 2) with minimized distortion and artifacts.

FIG. 4 is an example input and output to a trained GAN upscaling generator, according to some embodiments. FIG. 4 comprises fault detection data 401, 407 that are input (after a downsampling and weighting processing step as described variously above) into trained GAN upscaling generator 400 to generate denoised fault detection data 403, 409. The data 401 and 407 are 2-dimensional seismic fault images (i.e. heatmaps of probability values of faults). Distortion comprising blurriness in the data 401, 403 as well as edge-based artifacts such as the artifact 405 are minimized in the data 407, 409 which have a sharper resolution.

FIG. 5 is an example input and output to a trained GAN upscaling generator, according to some embodiments. FIG. 5 comprises fault detection data 501, that is input (after a downsampling and weighting processing step as described variously above) into trained GAN upscaling generator 500 to generate denoised fault detection data 503. The data 501 and 503 are 2-dimensional slices of original 3-dimesional fault images (not pictured). An image artifact 505 due to a fault identification workflow is mitigated in data 503, and the blurriness in data 501 is sharpened in data 503.

FIG. 5 is an example input and output to a trained GAN upscaling generator, according to some embodiments. FIG. 5 comprises fault detection data 501, 503, 505, and 507 that are input (after a downsampling and weighting processing step as described variously above) into trained GAN upscaling generator 500 to generate denoised fault detection data 509, 511, 513, 515. Fault blurriness occurring in dotted circles depicted in data 501, 503, 505, and 507 is sharpened in corresponding dotted circles in data 509, 511, 513, and 515. The dotted circles are pictured for exposition and actual data input into the trained GAN upscaling generator 500 does not comprise dotted circles.

FIG. 6 is an example input and output during training operations of a GAN upscaling generator training system, according to some embodiments. Downsampled and weighted fault data 601 is input into a GAN upscaling generator 600, which generates high resolution upscaled fault data 605. A GAN upscaling discriminator 602 receives the high resolution upscaled fault data 605 as well as the true fault data 603 and returns to the GAN upscaling generator an upscaled fault data evaluation 607 based on a comparison between the data 603 and the data 605. This comparison is based, at least in part, on the sharpness of faults identified in the pictured dotted circles (not included in the actual data 603, 605 used as input/output of each model).

Figure 7:
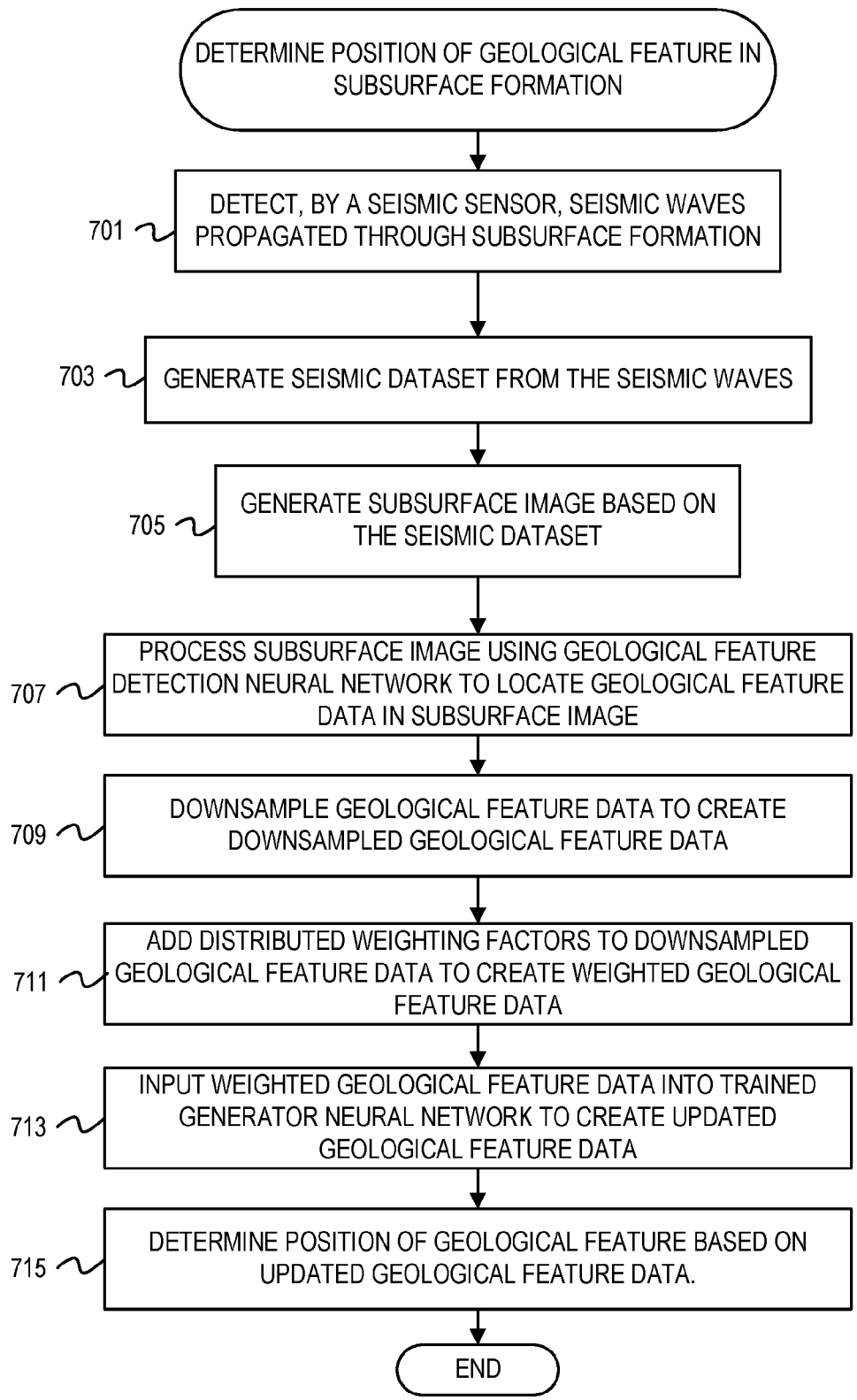
FIG. 7 is a flowchart of example operations for determining a position of a geological feature in subsurface formation, according to some embodiments.

FIG. 7 is a flowchart of example operations for determining a position of a geological feature in subsurface formation, according to some embodiments. The operations in FIG. 7 are described with reference to geological feature data. The geological feature data can include fault detection data as described herein. Some of the operations of the flowchart can be performed by software, firmware, hardware or a combination thereof. The operations of the flowchart start at block 701.

At block 701, a data acquisition system (DAS) detects seismic waves propagated through a subsurface formation. For example, with reference to FIG. 1, the seismic sensors 102 can forward detected seismic waves to the data acquisition system 106.

At block 703, the DAS generates a seismic dataset from the seismic waves detected at block 701. For example, with reference to FIG. 1, the data acquisition system 106 can process the data received from the seismic sensor 102 to generate the seismic dataset.

At block 705, the DAS generates a subsurface image based on the seismic dataset generated at block 703. For example, with reference to FIG. 1, the data acquisition system 106 can extract subsurface images from the seismic dataset corresponding to the subsurface formation.

At block 707, the subsurface image is processed using a geological feature detection neural network (for example, the DNN 201 with reference to FIG. 2) to generate geological feature data from the subsurface image. The geological feature data comprises probability values at locations throughout the subsurface formation, and the geological feature neural network can include an edge detection algorithm as described above.

At block 709, a data processor downsamples the geological feature data to create downsampled geological feature data as described above. For example, the data processor can downsample by a factor of 4 by choosing a pixel in 2×2 subblocks of the geological feature data at random.

At block 711, the data processor adds distributed weighting factors to downsampled geological feature data to create weighted geological feature data. The distributed weighting factors can comprise a soft thresholding functions that trends high probability values towards 1 and low probability values towards 0 as described variously above.

At block 713, the weighted geological feature data is inputted into a trained generator neural network to create updated geological feature data with minimized distortion and artifacts. The trained generator neural network can be a trained GAN upscaling generator as described variously above.

At block 715, a position of a geological feature is determined based on updated geological feature data. This operation can be performed by a domain-level expert or by a computer that is configured to receive updated geological feature data and run an algorithm on the geological feature data to determine high-likelihood positions of the geological feature. The geological feature can be, for example, a fault or set of faults in the subsurface formation.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 701 and 703 can be performed in parallel or concurrently. With respect to FIG. 7, a data acquisition system is not necessary depending on the configuration of downhole sensors used to detect seismic data. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Example Drilling System

FIG. 8 depicts an example drilling system, according to some embodiments. FIG. 8 depicts a drilling system 800. The drilling system 800 includes a drilling rig 801 located at the surface 802 of a borehole 803. The initial position of the borehole 803 and various operational parameters (e.g. drilling speed, weight on bit, drilling fluid pump rate, drilling direction, drilling fluid composition) for drilling can be selected based on the results of the operations using an automated fault interpretation system (as described above). The drill string 804 can be operated for drilling the borehole 803 through the subsurface formation 832 with the bottomhole assembly (BHA).

The BHA includes a drill bit 830 at the downhole end of the drill string 804. The drill bit 830 is in the vicinity of a fault 875, wherein the position of fault 875 can be determined by operations described herein. The BHA and the drill bit 830 can be coupled to a computer 850, which can operate the drill bit 830 as well as receive data based on the sensors attached to the BHA. The drill bit 830 can be operated to create the borehole 803 by penetrating the surface 802 and subsurface formation 832. In some embodiments, a drilling plan can call for the drill bit 830 to stop drilling when within a range of the fault 875. By increasing the accuracy of the seismic interpretation, the drill bit 830 can more safely and easily avoid penetrating through the fault 875. For example, sensors on the BHA can transmit a signal to the computer 850 that the drill bit is near the fault 875, and the computer 850 can stop the drill bit 830.

Example Wellbore System

A wellbore system 900 depicted in FIG. 9 comprises a wellbore 904 penetrating at least a portion of a subterranean formation 902. The wellbore 904 comprises one or more injection points 914 where one or more fluids can be injected from the wellbore 904 into the subterranean formation 902. The subterranean formation 902 can comprise pores initially saturated with reservoir fluids (e.g., oil, gas, and/or water). In certain embodiments, the wellbore system 900 can be treated by the injection of a fracturing fluid, acid, or proppant at one or more injection points 914 in the wellbore 904. In certain embodiments, the one or more injection points 914 can correspond to injection points 914 in a casing of the wellbore 904. When fluid enters the subterranean formation 902 at the injection points 914, one or more fractures 918 can be opened. In certain embodiments, a diverting agent can enter the injection point 914 and restrict the flow of further fluid. In some embodiments, the fracturing fluid can comprise a diverter.

As depicted in FIG. 9, the subterranean formation 902 includes at least one fracture network 908 connected to the wellbore 904. The fracture network 908 shown in FIG. 9 contains a number of junctions and fractures 918. The number of junctions and fractures can vary drastically and/or unpredictably depending on the specific characteristics of the subterranean formation 902. For example, the fracture network 908 can comprise on the order of thousands of fractures 918 to tens of thousands of fractures 918. In some embodiments, these fractures can be within range of a fault 975, wherein the position, orientation, and/or shape of the fault 975 is determined using an automated fault interpretation system.

In certain embodiments, an operational parameter can comprise one or more wellbore treatment controls and/or wellbore production controls. These operational parameters can be selected to avoid faults identified in the operations described above. In certain embodiments, the wellbore treatment controls can characterize a treatment operation for a wellbore 904 penetrating at least a portion of a subterranean formation 902. In certain embodiments, the operational parameters can include, but are not limited to an amount of acid, fracturing fluid or diverter pumped into the wellbore system 900, a proppant concentration pumped into the wellbore system 900, a proppant size used during pumping into the wellbore system 900, a wellbore pressure at the injection points 914, a fluid or diverter flow rate at the wellbore inlet 910, the pressure at the wellbore inlet 910, duration of a acidizing/stimulation treatment, a diverter particle diameter, and any combination thereof. In certain embodiments, in response to calculations determining that a fracturing or acidization operation may damage or perforate the fault 975, an operational parameter can be altered to prevent the damage/perforation from occurring. For example, a computer system can determine that a set of operational parameters will result in damaging the fault 975, and, in response, reduce a fluid flow rate at the surface 906.

In certain embodiments, the one or more operational parameters can be changed in response to real-time measurements. In some embodiments, real-time measurements can comprise pressure measurements, flow rate measurements, and seismic measurements. In certain embodiments, real-time measurements can be obtained from one or more wellsite data sources or sensors in acoustic communication with the subterranean formation 902. Wellsite data sources can include, but are not limited to, flow sensors, pressure sensors, thermocouples, and any other suitable measurement apparatus. In certain embodiments, wellsite data sources can be positioned at the surface, on a downhole tool, in the wellbore 904 or in fractures 918. Pressure measurements can, for example, be obtained from a pressure sensor at a surface of the wellbore 904.

Example Computer

A computer device 1000 includes a processor 1001 (possibly including multiple processors, multiple cores, multiple nodes, and/or implementing multi-threading, etc.). The computer device 1000 includes a memory 1007. The memory 1007 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 1000 also includes a bus 1003 (e.g., PCI, ISA, PCI-Express, Hyper-Transport® bus, InfiniBand® bus, NuBus, etc.) and a network interface 1005 (e.g., a Fiber Channel interface, an Ethernet interface, an internet small computer system interface, SONET interface, wireless interface, etc.).

Figure 10:
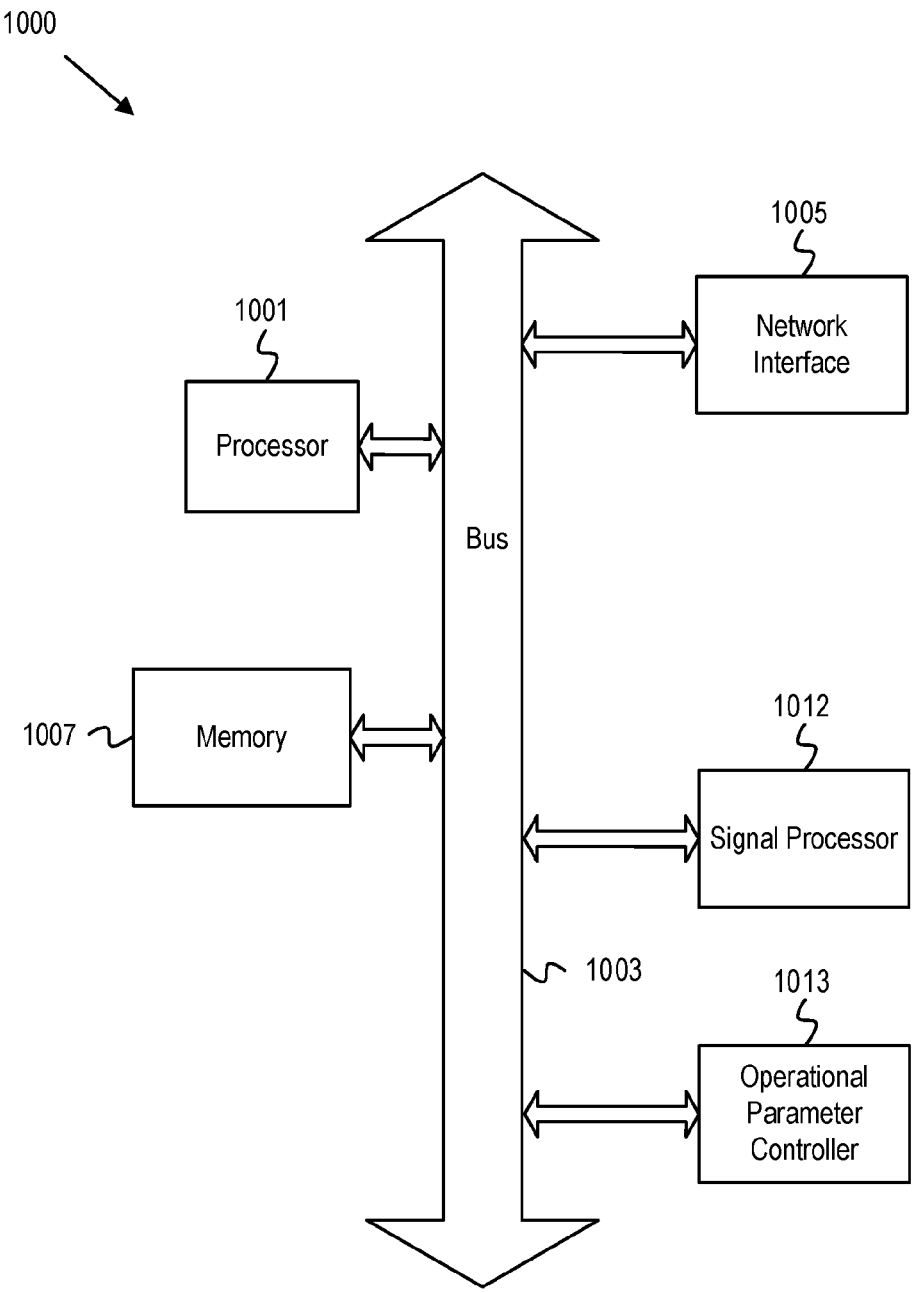
FIG. 10 depicts an example computer, according to some embodiments.

In some embodiments, the computer device 1000 includes a signal processor 1012 and an operational parameter controller 1013. The signal processor 1012 is configured to detect seismic data in a subsurface formation, generate fault detection data using the seismic data and a deep neural network, and generate high resolution fault detection data with minimized distortion and artifacts from the fault detection data using a GAN upscaling generator (as described herein). The operational parameter controller 1013 can perform one or more operations for controlling a drilling system or a wellbore system, including controlling a drill bit, fluid pump rate, etc. For example, the operational parameter controller 1013 can modify a drilling direction, weight on bit, rotation rate of the drill bit, etc. Any one of the previously described functionalities can be partially (or entirely) implemented in hardware and/or on the processor 1001. For example, the functionality can be implemented with an application specific integrated circuit, in logic implemented in the processor 1001, in a co-processor on a peripheral device or card, etc. Further, realizations can include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 can be coupled to the processor 1001. The computer device 1000 can be integrated into component(s) of the drill pipe downhole and/or be a separate device at the surface that is communicatively coupled to the BHA downhole for controlling and processing signals (as described herein).

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine-readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine-readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic progmmming language such as Python; a scripting language such as Perl programming language or PowerShell script language; and conventional procedural progmmming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Embodiment 1: a method comprising detecting, by a seismic sensor, seismic waves propagated through a subsurface formation, generating a subsurface image based on the detected seismic waves, converting, using a geological feature detection neural network, pixels of the subsurface image into probability values, wherein a probability value defines a likelihood of a geological feature occurring at a corresponding location of a pixel in the subsurface formation, reducing a resolution of the probability values of the subsurface image to create reduced resolution probability values of the subsurface image, weighting one or more of the reduced resolution probability values based on the likelihood of the geological feature occurring at a corresponding location of the pixel in the subsurface formation, creating increased resolution probability values of the subsurface image using a trained generator neural network based on inputting of the weighted reduced probability values into the trained generator neural network, and determining a position of a geological feature in the subsurface formation based on the increased resolution probability values of the subsurface image.

Embodiment 2: the method of embodiment 1, wherein reducing the resolution of the probability values comprises downsampling of the probability values of the subsurface image.

Embodiment 3: the method of one or more of embodiments 1-2, wherein weighting the one or more reduced resolution probability values comprises based on a determination that a reduced resolution probability value is more likely to correspond to a location in the subsurface image that includes a part of a geological feature than a location in the subsurface image that does not include a part of a geological feature, increasing the reduced resolution probability value, and based on a determination that a reduced resolution probability value is less likely to correspond to a location in the subsurface image that includes a part of a geological feature than a location in the subsurface image that does not include a part of a geological feature, decreasing the reduced resolution probability value.

Embodiment 4: the method of one or more of embodiments 1-3, wherein the geological feature is at least one of a fracture and a geological fault.

Embodiment 5: the method of one or more of embodiments 1-4, further comprising training the trained generator neural network using a generative adversarial network.

Embodiment 6: the method of embodiment 5, wherein training the trained generator neural network using the generative adversarial network comprises inputting batches of synthetic geological feature data into the generative adversarial network.

Embodiment 7: the method of one or more of embodiments 1-6, further comprising modifying a hydrocarbon recovery operation in a borehole formed in the subsurface formation based on the position of the geological feature.

Embodiment 8: a non-transitory, machine-readable medium having program code stored thereon that is executable by a machine, the program code comprising instructions to receive, from a seismic sensor, seismic waves propagated through a subsurface formation, generate a subsurface image based on the detected seismic waves, convert, using a geological feature detection neural network, pixels of the subsurface image into probability values, wherein a probability value defines a likelihood of a geological feature occurring at a corresponding location of a pixel in the subsurface formation, reduce a resolution of the probability values of the subsurface image to create reduced resolution probability values of the subsurface image, weight one or more of the reduced resolution probability values based on the likelihood of the geological feature occurring at a corresponding location of the pixel in the subsurface formation, create increased resolution probability values of the subsurface image using a trained generator neural network based on inputting of the weighted reduced probability values into the trained generator neural network, and determine a position of a geological feature in the subsurface formation based on the increased resolution probability values of the subsurface image.

Embodiment 9: the non-transitory, machine-readable medium of embodiment 8, wherein the instructions to reduce the resolution of the probability values comprise instructions to downsample the probability values of the subsurface image.

Embodiment 10: the non-transitory, machine-readable medium of one or more of embodiments 8-9, wherein the instructions to weight the one or more reduced resolution probability values comprise instructions to, based on a determination that a reduced resolution probability value is more likely to correspond to a location in the subsurface image that includes a part of a geological feature than a location in the subsurface image that does not include a part of a geological feature, increasing the reduced resolution probability value, and based on a determination that a reduced resolution probability value is less likely to correspond to a location in the subsurface image that includes a part of a geological feature than a location in the subsurface image that does not include a part of a geological feature, decreasing the reduced resolution probability value.

Embodiment 11: the non-transitory, machine-readable medium of one or more of embodiments 8-10, wherein the geological feature is at least one of a fracture and a geological fault.

Embodiment 12: the non-transitory, machine-readable medium of one or more of embodiments 8-11, wherein the program code further comprises instructions to train the trained generator neural network using a generative adversarial network.

Embodiment 13: the non-transitory, machine-readable medium of embodiment 12, wherein the instructions to train the trained generator neural network using the generative adversarial network comprise instructions to input batches of synthetic geological feature data into the generative adversarial network.

Embodiment 14: the non-transitory, machine-readable medium of one or more of embodiments 8-13, wherein the program code further comprises instructions to modify a hydrocarbon recovery operation in a borehole formed in the subsurface formation based on the position of the geological feature.

Embodiment 15: a system comprising a seismic sensor to detect seismic waves propagated through a subsurface formation, a processor, and a machine-readable medium having instructions stored thereon that are executable by the processor to cause the system to, generate a subsurface image based on the detected seismic waves, convert, using a geological feature detection neural network, pixels of the subsurface image into probability values, wherein a probability value defines a likelihood of a geological feature occurring at a corresponding location of a pixel in the subsurface formation, reduce a resolution of the probability values of the subsurface image to create reduced resolution probability values of the subsurface image, weight one or more of the reduced resolution probability values based on the likelihood of the geological feature occurring at a corresponding location of the pixel in the subsurface formation, create increased resolution probability values of the subsurface image using a trained generator neural network based on inputting of the weighted reduced probability values into the trained generator neural network, and determine a position of a geological feature in the subsurface formation based on the increased resolution probability values of the subsurface image.

Embodiment 16: the system of embodiment 15, wherein the instructions executable by the processor to cause the system to reduce the resolution of the probability values comprise instructions to downsample the probability values of the subsurface image.

Embodiment 17: the system of one or more of embodiments 15-16, wherein the instructions executable by the processor to cause the system to weight the one or more reduced resolution probability values comprise instructions to, based on a determination that a reduced resolution probability value is more likely to correspond to a location in the subsurface image that includes a part of a geological feature than a location in the subsurface image that does not include a part of a geological feature, increasing the reduced resolution probability value, and based on a determination that a reduced resolution probability value is less likely to correspond to a location in the subsurface image that includes a part of a geological feature than a location in the subsurface image that does not include a part of a geological feature, decreasing the reduced resolution probability value.

Embodiment 18: the system of one or more of embodiments 15-17, wherein the geological feature is at least one of a fracture and a geological fault.

Embodiment 19: the system of one or more of embodiments 15-18, further comprising instructions executable by the processor to cause the system to train the trained generator neural network using a generative adversarial network.

Embodiment 20: the system of embodiment 19, wherein the instructions executable by the processor to cause the system to train the trained generator neural network using the generative adversarial network comprise instructions to input batches of synthetic geological feature data into the generative adversarial network.

What is claimed is:

1. A method comprising:
    detecting, by a seismic sensor, seismic waves propagated through a subsurface formation;
    generating a subsurface image based on the detected seismic waves;
    converting, using a geological feature detection neural network, pixels of the subsurface image into probability values, wherein a probability value defines a likelihood of a geological feature occurring at a corresponding location of a pixel in the subsurface formation;
    reducing a resolution of the probability values of the subsurface image to create reduced resolution probability values of the subsurface image;
    modifying, using distributed weighting factors, one or more of the reduced resolution probability values based on the likelihood of the geological feature occurring at the corresponding location of the pixel in the subsurface formation to generate weighted reduced resolution probability values;
    inputting the weighted reduced resolution probability values into a trained generator neural network to generate increased resolution probability values of the subsurface image; and
    determining a position of the geological feature in the subsurface formation based on the increased resolution probability values of the subsurface image.

2. The method of claim 1, wherein reducing the resolution of the probability values comprises downsampling of the probability values of the subsurface image.

3. The method of claim 1, wherein modifying the one or more of the reduced resolution probability values comprises:
    based on a determination that a reduced resolution probability value is more likely to correspond to a location in the subsurface image that includes a part of the geological feature than a location in the subsurface image that does not include the part of the geological feature, increasing the reduced resolution probability value; and
    based on a determination that a reduced resolution probability value is less likely to correspond to the location in the subsurface image that includes the part of the geological feature than the location in the subsurface image that does not include the part of the geological feature, decreasing the reduced resolution probability value.

4. The method of claim 1, wherein the geological feature is at least one of a fracture and a geological fault.

5. The method of claim 1, further comprising training the trained generator neural network using a generative adversarial network.

6. The method of claim 5, wherein training the trained generator neural network using the generative adversarial network comprises inputting batches of synthetic geological feature data into the generative adversarial network.

7. The method of claim 1, further comprising modifying a hydrocarbon recovery operation in a borehole formed in the subsurface formation based on the position of the geological feature.

8. A non-transitory, machine-readable medium having program code stored thereon that is executable by a machine, the program code comprising instructions to:
receive, from a seismic sensor, seismic waves propagated through a subsurface formation;
generate a subsurface image based on the received seismic waves;
convert, using a geological feature detection neural network, pixels of the subsurface image into probability values, wherein a probability value defines a likelihood of a geological feature occurring at a corresponding location of a pixel in the subsurface formation;
reduce a resolution of the probability values of the subsurface image to create reduced resolution probability values of the subsurface image;
modify, using distributed weighting factors, one or more of the reduced resolution probability values based on the likelihood of the geological feature occurring at the corresponding location of the pixel in the subsurface formation to generate weighted reduced resolution probability values;
input the weighted reduced resolution probability values into a trained generator neural network to generate increased resolution probability values of the subsurface image; and
determine a position of the geological feature in the subsurface formation based on the increased resolution probability values of the subsurface image.

9. The non-transitory, machine-readable medium of claim 8, wherein the instructions to reduce the resolution of the probability values comprise instructions to downsample the probability values of the subsurface image.

10. The non-transitory, machine-readable medium of claim 8, wherein the instructions to modify the one or more of the reduced resolution probability values comprise instructions to:
based on a determination that a reduced resolution probability value is more likely to correspond to a location in the subsurface image that includes a part of the geological feature than a location in the subsurface image that does not include the part of the geological feature, increasing the reduced resolution probability value; and
based on a determination that a reduced resolution probability value is less likely to correspond to the location in the subsurface image that includes the part of the geological feature than the location in the subsurface image that does not include the part of the geological feature, decreasing the reduced resolution probability value.

11. The non-transitory, machine-readable medium of claim 8, wherein the geological feature is at least one of a fracture and a geological fault.

12. The non-transitory, machine-readable medium of claim 8, wherein the program code further comprises instructions to train the trained generator neural network using a generative adversarial network.

13. The non-transitory, machine-readable medium of claim 12, wherein the instructions to train the trained generator neural network using the generative adversarial network comprise instructions to input batches of synthetic geological feature data into the generative adversarial network.

14. The non-transitory, machine-readable medium of claim 8, wherein the program code further comprises instructions to modify a hydrocarbon recovery operation in a borehole formed in the subsurface formation based on the position of the geological feature.

15. A system comprising:
a seismic sensor to detect seismic waves propagated through a subsurface formation;
a processor; and
a machine-readable medium having instructions stored thereon that are executable by the processor to cause the system to,
generate a subsurface image based on the detected seismic waves;
convert, using a geological feature detection neural network, pixels of the subsurface image into probability values, wherein a probability value defines a likelihood of a geological feature occurring at a corresponding location of a pixel in the subsurface formation;
reduce a resolution of the probability values of the subsurface image to create reduced resolution probability values of the subsurface image;
modify, using distributed weighting factors, one or more of the reduced resolution probability values based on the likelihood of the geological feature occurring at the corresponding location of the pixel in the subsurface formation to generate weighted reduced resolution probability values;
input the weighted reduced resolution probability values into a trained generator neural network to generate increased resolution probability values of the subsurface image; and
determine a position of the geological feature in the subsurface formation based on the increased resolution probability values of the subsurface image.

16. The system of claim 15, wherein the instructions executable by the processor to cause the system to reduce the resolution of the probability values comprise instructions to downsample the probability values of the subsurface image.

17. The system of claim 15, wherein the instructions executable by the processor to cause the system to modify the one or more of the reduced resolution probability values comprise instructions to:
based on a determination that a reduced resolution probability value is more likely to correspond to a location in the subsurface image that includes a part of the geological feature than a location in the subsurface image that does not include the part of the geological feature, increasing the reduced resolution probability value; and
based on a determination that a reduced resolution probability value is less likely to correspond to the location in the subsurface image that includes the part of the geological feature than the location in the subsurface image that does not include the part of the geological feature, decreasing the reduced resolution probability value.

18. The system of claim 15, wherein the geological feature is at least one of a fracture and a geological fault.

19. The system of claim 15, further comprising instructions executable by the processor to cause the system to train the trained generator neural network using a generative adversarial network.

20. The system of claim 19, wherein the instructions executable by the processor to cause the system to train the trained generator neural network using the generative adversarial network comprise instructions to input batches of synthetic geological feature data into the generative adversarial network.

\* \* \* \* \*